(12) United States Patent
Górski et al.

(10) Patent No.: US 10,816,055 B2
(45) Date of Patent: Oct. 27, 2020

(54) DAMPER BUMPER CAP WITH LABYRINTH AIR PASSAGEWAY

(71) Applicant: Tenneco Automotive Operating Company Inc., Lake Forest, IL (US)

(72) Inventors: Tomasz Górski, Laziska Gorne (PL); Sebastian Kostelecki, Katowice (PL)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 0 days.

(21) Appl. No.: 15/964,317

(22) Filed: Apr. 27, 2018

(65) Prior Publication Data

US 2019/0331192 A1 Oct. 31, 2019

(51) Int. Cl.
| | |
|---|---|
| *F16F 9/38* | (2006.01) |
| *F16F 9/32* | (2006.01) |
| *F16F 9/36* | (2006.01) |
| *B60G 13/00* | (2006.01) |

(52) U.S. Cl.
CPC .............. *F16F 9/3242* (2013.01); *F16F 9/36* (2013.01); *F16F 9/38* (2013.01); *B60G 13/001* (2013.01); *B60G 2204/41* (2013.01); *F16F 2230/0023* (2013.01); *F16F 2230/105* (2013.01); *F16F 2230/30* (2013.01)

(58) Field of Classification Search
CPC ...... B60G 2204/4502; B60G 2204/124; B60G 2202/31; B60G 2202/312; F16F 9/58; F16F 9/38; F16F 9/369; F16F 9/3242; F16F 9/361; F16J 15/447; F16J 15/4472; F16J 15/4476

See application file for complete search history.

(56) References Cited

U.S. PATENT DOCUMENTS

| | | | |
|---|---|---|---|
| 4,364,457 | A | 12/1982 | Wossner et al. |
| 6,199,844 | B1 | 3/2001 | McCormick et al. |
| 7,810,619 | B2 | 10/2010 | Maeda |

(Continued)

FOREIGN PATENT DOCUMENTS

| | | |
|---|---|---|
| CN | 203962832 U | 11/2014 |
| CN | 204784402 U | 11/2015 |

(Continued)

OTHER PUBLICATIONS

International Search Report and Written Opinion issued in related PCT Application No. PCT/US2019/027466 dated Aug. 7, 2019.

*Primary Examiner* — Bradley T King
*Assistant Examiner* — Stephen M Bowes
(74) *Attorney, Agent, or Firm* — Harness, Dickey & Pierce (57) ABSTRACT

A damper bumper cap for covering the rod side end of the damper tube containing a piston rod seal and for retaining a dust cover on the damper tube. The cap includes a side wall positioned in contact with the damper tube, an end wall that extends radially inwardly over the piston rod seal, and an annular skirt that is spaced radially outward of the side wall. First and second groups of connection wall segments extend radially between the side wall and the annular skirt at different heights to define vent openings in the spaces between the connection wall segments in the first and second groups of connection wall segments. The vent openings thus provide a plurality of tortuous airflow paths through the cap at circumferentially spaced locations.

15 Claims, 8 Drawing Sheets

(56) References Cited

U.S. PATENT DOCUMENTS

| | | | |
|---|---|---|---|
| 9,022,188 B2 | 5/2015 | Lee et al. | |
| 2002/0189441 A1 * | 12/2002 | Collis | F16F 9/38 |
| | | | 92/165 R |
| 2004/0168871 A1 * | 9/2004 | Handke | B60G 15/062 |
| | | | 188/322.12 |
| 2006/0061025 A1 * | 3/2006 | Deigner | B60G 15/063 |
| | | | 267/170 |
| 2009/0145707 A1 * | 6/2009 | Henneberg | B60G 13/00 |
| | | | 188/322.12 |
| 2013/0220751 A1 | 8/2013 | Seo | |

FOREIGN PATENT DOCUMENTS

| | | | | |
|---|---|---|---|---|
| DE | 4233319 A1 * | 4/1994 | | F19F 9/38 |
| DE | 10138196 C1 | 10/2002 | | |
| FR | 2747754 A1 * | 10/1997 | | B60G 7/04 |
| JP | S60122036 U | 8/1985 | | |
| JP | 63-79204 U * | 5/1988 | | B60G 13/06 |
| JP | S6379204 U | 5/1988 | | |
| JP | 20000081075 A | 3/2000 | | |
| JP | 2009222223 A | 10/2009 | | |
| JP | 4634667 B2 | 2/2011 | | |
| JP | 2013164092 A | 8/2013 | | |
| JP | 5912621 B2 | 4/2016 | | |
| KR | 20020051434 A | 6/2002 | | |
| KR | 100694909 B1 | 3/2007 | | |
| KR | 100716428 B1 | 5/2007 | | |
| KR | 100766857 B1 | 10/2007 | | |
| KR | 20100137266 A * | 12/2010 | | |
| KR | 101276870 B1 | 6/2013 | | |
| KR | 101744302 B1 | 6/2017 | | |

\* cited by examiner

DAMPER BUMPER CAP WITH LABYRINTH AIR PASSAGEWAY

FIELD

The present disclosure relates to automotive shock absorbers/dampers. More particularly, the present disclosure relates to damper bumper caps that protect the piston rod seal from contact with the jounce bumper of a shock absorber/damper.

BACKGROUND

The statements in this section merely provide background information related to the present disclosure and may not constitute prior art.

Shock absorbers are typically used in conjunction with automotive suspension systems or other suspension systems to absorb unwanted vibrations that occur during movement of the suspension system. In order to absorb these unwanted vibrations, automotive shock absorbers are generally connected between the sprung (body) and the unsprung (suspension/drivetrain) masses of the vehicle.

In typical shock absorbers, a piston is located within a fluid chamber defined by a damper tube and is connected to the sprung mass of the vehicle through a piston rod. The damper tube is connected to the unsprung mass of the vehicle. For the shock absorber to work properly, a seal must be maintained between the piston rod and the damper tube. During standard operation of the shock absorber, dust particles and other contaminants can accumulate on the piston rod and the piston rod seal, which can cause damage to the piston rod and/or the piston rod seal. Such damage can result in oil leakage from the fluid chamber, which decreases shock absorber function. In order to reduce dust contamination, dust covers are commonly used. Dust covers extend annularly about the portion of the piston rod that extends outside the damper tube.

During a compression stroke of the shock absorber, the dust cover is longitudinally compressed. As a result, air is forced out of the inner chamber inside the dust cover. During a rebound stroke of the shock absorber, the dust cover expands longitudinally and air flows into the inner chamber inside the dust cover. The inner chamber inside the dust cover therefore must be vented to the atmosphere. If this were not so, the pressure in the inner chamber inside the dust cover would blow the dust cover off the shock absorber during a compression stroke. One problem with venting the inner chamber inside the dust cover is that dust and other contaminants can enter the inner chamber inside the dust cover and foul the piston rod seal. Accordingly, there remains a need for improved venting solutions for dust covers that reduce the amount of dust that enters the inner chamber inside the dust cover.

SUMMARY

This section provides a general summary of the disclosure, and is not a comprehensive disclosure of its full scope or all of its features.

In accordance with one aspect of the subject disclosure, a damper system for a vehicle is provided. The damper system includes a damper tube, a piston rod, and a piston assembly. The damper tube extends longitudinally between a rod side end and a closed end. The piston rod extends along a longitudinal axis between first and second piston rod ends. The first piston rod end supports a jounce bumper and the second piston rod end is disposed inside the damper tube and is coupled to the piston assembly. The piston assembly is slidably received in the damper tube and is moveable along the longitudinal axis. A piston rod seal is positioned radially between the piston rod and the rod side end of the damper tube. A dust cover extends annularly about the rod side end of the damper tube and an exposed portion of the piston rod that is positioned outside the damper tube.

A damper bumper cap is positioned over the rod side end of the damper tube and the piston rod seal. The cap and the dust cover cooperate to define an inner chamber around at least part of the piston rod. The cap includes a side wall, an end wall, and an annular skirt. The side wall is positioned in contact with the rod side end of the damper tube. The side wall extends annularly about the rod side end of the damper tube and longitudinally from the end wall to a side wall end. The end wall extends radially inwardly from the side wall and over at least a portion of the piston rod seal. The end wall includes a rod aperture through which the piston rod extends. The annular skirt is spaced radially outward of the side wall relative to the longitudinal axis. A connection wall extends between the side wall and the annular skirt. The connection wall includes vent openings that define a plurality of tortuous airflow paths through the cap at circumferentially spaced locations that vent the inner chamber to a space outside of the dust cover (e.g., the atmosphere).

In accordance with another aspect of the subject disclosure, the connection wall includes a first group of connection wall segments that extend radially between the side wall and the annular skirt and a second group of connection wall segments that extend radially between the side wall and the annular skirt. The connection wall segments in the first group of connection wall segments are arranged at a different height than the connection wall segments in the second group of connection wall segments relative to the side wall end. The vent openings and therefore the plurality of tortuous airflow paths are created by the spaces between the connection wall segments in the first group of connection wall segments and the connection wall segments in the second group of connection wall segments.

Other than the plurality of tortuous airflow paths, there are no additional flow paths through which air from the atmosphere (i.e., the surrounding environment) can enter the inner chamber inside the dust cover. As a result, fewer contaminants reach the piston rod seal, prolonging the service life of the shock absorber and reducing complaints due to hydraulic fluid leaks from the piston rod seal. The subject designs therefore reduce the number of warranty claims due to failed/damaged piston rod seals.

Further areas of applicability and advantages will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

The following description is merely exemplary in nature and is not intended to limit the present disclosure, application, or uses.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
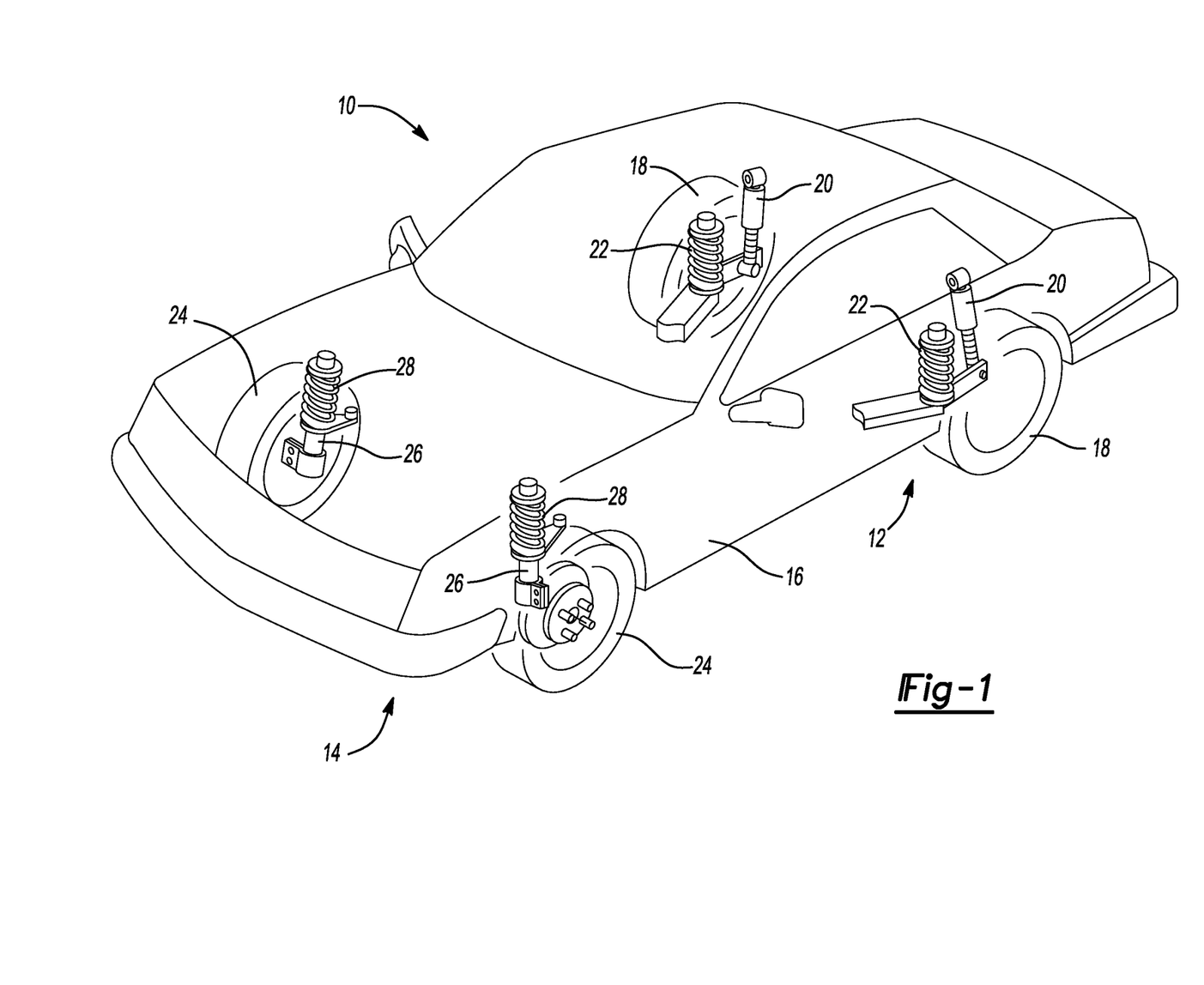
FIG. 1 is an illustration of an exemplary vehicle equipped with four shock absorbers constructed in accordance with the teachings of the present disclosure.

Referring to FIG. 1, a vehicle 10 including a rear suspension 12, a front suspension 14, and a body 16 is illustrated. The rear suspension 12 has a transversely extending rear axle assembly (not shown) adapted to operatively support the vehicle's rear wheels 18. The rear axle assembly is operatively connected to the body 16 by a pair of shock absorbers 20 and a pair of helical coil springs 22. Similarly, front suspension 14 includes a transversely extending front axle assembly (not shown) to operatively support the vehicle's front wheels 24. The front axle assembly is operatively connected to body 16 by a second pair of shock absorbers 26 and by a pair of helical coil springs 28. Shock absorbers 20 and 26 serve to dampen the relative motion of the unsprung portion (i.e., front and rear suspensions 14 and 12, respectively) and the sprung portion (i.e., body 16) of vehicle 10. While the vehicle 10 has been depicted as a passenger car having front and rear axle assemblies, shock absorbers 20 and 26 may be used with other types of vehicles or machinery, or in other types of applications such as vehicles incorporating independent front and/or independent rear suspension systems. Further, the term "shock absorber" as used herein is meant to refer to shock absorbers and shock absorber systems in general and thus will include MacPherson struts. It should also be appreciated that the scope of the subject disclosure is intended to include shock absorber systems for stand-alone shock absorbers 20 and coil-over shock absorbers 26.

Figure 2:
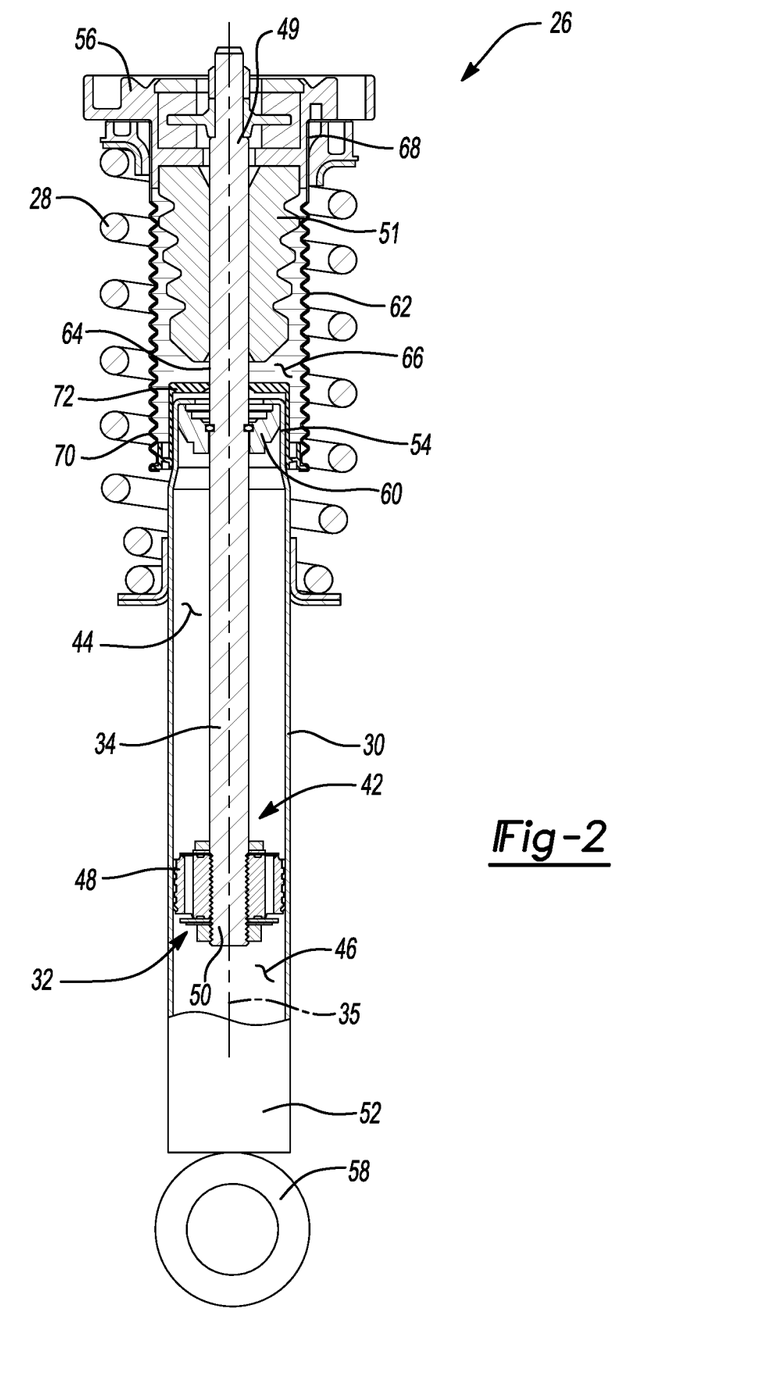
FIG. 2 is a side section view of a shock absorber constructed in accordance with the teachings of the present disclosure.
Figure 3:
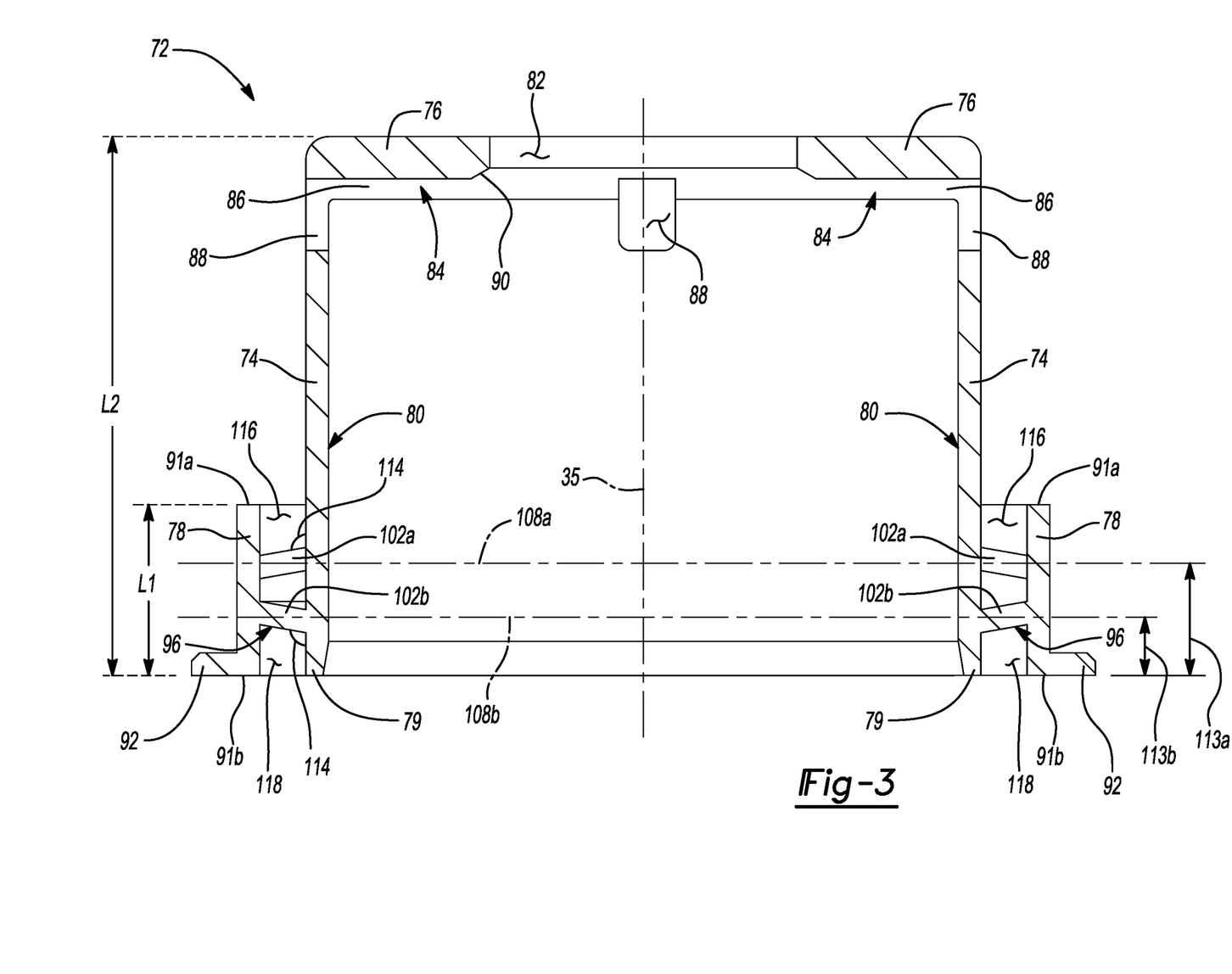
FIG. 3 is a side section view depicting an exemplary damper bumper cap constructed in accordance with the teachings of the present disclosure.

With additional reference to FIG. 2, shock absorber 26 is shown in greater detail. Shock absorber 26 comprises a damper tube 30, a piston assembly 32, and a piston rod 34. The damper tube 30 and the piston rod 34 extend co-axially along a longitudinal axis 35. The damper tube 30 defines an inner cavity 42. The inner cavity 42 of the damper tube 30 is filled with a hydraulic fluid, such as oil. The piston assembly 32 is slidably disposed within the inner cavity 42 of the damper tube 30 and divides the inner cavity 42 into a first working chamber 44 and a second working chamber 46. A seal 48 is disposed between the piston assembly 32 and the damper tube 30 to permit sliding movement of the piston assembly 32 with respect to damper tube 30 without generating undue frictional forces as well as sealing the first working chamber 44 from the second working chamber 46.

The piston rod 34 extends along the longitudinal axis 35 between a first piston rod end 49 and a second piston rod end 50. A jounce bumper 51 is supported on the first piston rod end 49. The jounce bumper 51 may be made of a variety of different materials, including without limitation, elastomeric material. The damper tube 30 extends longitudinally between a closed end 52 and a rod side end 54. The second piston rod end 50 is disposed inside the damper tube 30 and is coupled to the piston assembly 32. Accordingly, the piston rod 34 extends longitudinally through the first working chamber 44 and through the rod side end 54 of the damper tube 30. The first piston rod end 49 includes a piston rod mount 56, which is configured to be connected to the body 16 of the vehicle 10 (i.e., the sprung portion of vehicle 10). The closed end 52 of the damper tube 30 includes an attachment fitting 58, which is configured to be connected to the unsprung portion of the suspension 12 and 14. The first working chamber 44 is thus positioned between the rod side end 54 of the damper tube 30 and the piston assembly 32 and the second working chamber 46 is positioned between the closed end 52 of the damper tube 30 and the piston assembly 32. A piston rod seal 60 is positioned radially between the piston rod 34 and the rod side end 54 of the damper tube 30. A dust cover 62 extends annularly about the rod side end 54 of the damper tube 30 and an exposed portion 64 of the piston rod 34 that is positioned outside the damper tube 30. The dust cover therefore encloses an inner chamber 66 and extends longitudinally between first and second dust cover ends 68, 70. The piston rod seal 60 and the dust cover 62 may be made of a variety of different materials, including without limitation, elastomeric material.

Suspension movements of the vehicle 10 will cause extension/rebound or compression movements of piston assembly 32 with respect to damper tube 30. Valving within piston assembly 32 controls the movement of hydraulic fluid between the first working chamber 44 and the second working chamber 46 during movement of the piston assembly 32 within the damper tube 30. It should be appreciated that the shock absorber 26 may be installed in a reverse orientation, where the piston rod mount 56 is connected to the unsprung portion of the suspension 12 and 14 and the attachment fitting 58 of the damper tube 30 is connected to the body 16 (i.e., the sprung portion of vehicle 10). While FIG. 2 shows only shock absorber 26, it is to be understood that shock absorber 20 only differs from shock absorber 26 in the way in which it is adapted to be connected to the sprung and unsprung portions of vehicle 10 and the mounting location of the coil spring 28 relative to the shock absorber 26.

A damper bumper cap 72 is positioned over the rod side end of the damper tube 30 and the piston rod seal 60. The cap 72 may be made of a variety of different materials, including without limitation, polypropylene, polyamide, or glass-reinforced polyamide. It should also be appreciated that the cap 72 may be made using a variety of manufacturing processes, including without limitation, injection molding. The cap 72 protects the piston rod seal 60 from contact with the jounce bumper 51 when the shock absorber 26 is in a compressed state. With additional reference to FIGS. 3-6, the cap 72 includes a side wall 74, an end wall 76, and an annular skirt 78. The side wall 74 extends annularly about the rod side end 54 of the damper tube 30 and extends longitudinally from the end wall 76 to a side wall end 79. The side wall 74 includes an inside surface 80 that is arranged in contact with the damper tube 30 in an interference fit. The inside surface 80 of the side wall 74 of the cap 72 is cylindrical in shape and is smooth. The inside surface 80 does not have any ribs or protrusions like conventional damper bumper caps. As a result, air flow cannot travel between the damper tube 30 and the inside surface 80 of the side wall 74. This is different from conventional damper bumper caps where ribs define an airflow path between the damper tube 30 and the side wall.

The end wall 76 extends radially inwardly from the side wall 74 and over at least a portion of the piston rod seal 60 to a rod aperture 82. The piston rod 34 extends through the rod aperture 82 in the end wall 76 of the cap 72. The end wall 76 also includes an inner surface 84 with radially extending channels 86. The radially extending channels 86 on inner surface 84 of the end wall 76 are disposed in fluid communication with side wall openings 88 that extend through the side wall 74 at circumferentially spaced locations adjacent to the junction between the side wall 74 and the end wall 76 of the cap 72. The radially extending channels 86 and the side wall openings 88 cooperate to allow water, dust, and other contaminants to drain out from under the cap 72 along flow paths 89 instead of accumulating between the end wall 76 of the cap 72 and the piston rod seal 60. Optionally, the inner surface 84 of the end wall 76 may include a tapered face 90 adjacent to the rod aperture 82, which gives the inner surface 84 of the wall a concave shape around the rod aperture 82. In accordance with this configuration, the radially extending channels 86 extend between the tapered face 90 and the side wall openings 88 to allow water, dust, and contaminants to drain from the space created by the tapered face 90 on the inner surface 84 of the end wall 76.

The annular skirt 78 of the cap 72 extends longitudinally between first and second skirt ends 91a, 91b and is spaced radially outward of the side wall 74 relative to the longitudinal axis 35. Like the side wall 74, the annular skirt 78 has a cylindrical shape and is co-axially arranged with the side wall 74 about the longitudinal axis 35. The first dust cover end 68 is retained on the piston rod mount 56 and the second dust cover end 70 is retained on the cap 72. The connection between the second dust cover end 70 and the cap 72 may take many forms. In the illustrated example, the cap 72 includes a flange 92 that extends radially outwardly from the annular skirt 78 at the second skirt end 91b relative to the longitudinal axis 35 and the second dust cover end 70 includes an annular groove 94 that receives the flange 92 of the cap 72. This connection therefore creates a seal that prevents air flow from traveling between the dust cover 62 and the annular skirt 78 of the cap 72.

Still referring to FIGS. 3-6, the cap 72 includes a connection wall 96 (i.e., partition) that extends between the side wall 74 and the annular skirt 78. The connection wall 96 includes vent openings 98 that define a plurality of tortuous airflow paths 100 through the cap 72 at circumferentially spaced locations. Although other configurations are possible, in the illustrated examples, the connection wall 96 includes a first group of connection wall segments 102a and a second group of connection wall segments 102b that are arranged at different heights relative to the side wall 74 end. As a result, the first group of connection walls 96 and the second group of connections wall segments 102a, 102b are bisected by two longitudinally spaced planes 108a, 108b that are generally parallel to the end wall 76 of the cap 72. Each connection wall segment 102a, 102b in the first group of connection wall segments 102a and the second group of connection wall segments 102b extends circumferentially about a portion of the side wall 74 in an arc between two connection wall ends 110a, 110b. As a result, each connection wall segment 102a, 102b has a limited circumferential extent 112 that is measured relative to the longitudinal axis 35 between the two connection wall ends 110a, 110b. In the illustrated examples, the circumferential extent 112 of each connection wall segment 102a, 102b is 90 degrees or less.

Other embodiments are possible depending on the desired amount of airflow through the cap 72. For example, the connection wall 96 may include first and second connection wall segments 102a, 102b that are arranged at different heights 113a, 113b relative to the side wall end 79 and that extend circumferentially about a portion of the side wall 74 in an arc that spans 180 degrees or less. In accordance with this embodiment, each of the first and second connection wall segments 102a, 102b have a circumferential extent 112 of 180 degrees or less and two vent openings 98 are defined between the first and second connection wall segments 102a, 102b. It should be appreciated that the number and cross-sectional area of the vent openings 98 can be optimized depending on the air flow (air volume) requirements of the shock absorber 26.

Figure 5:
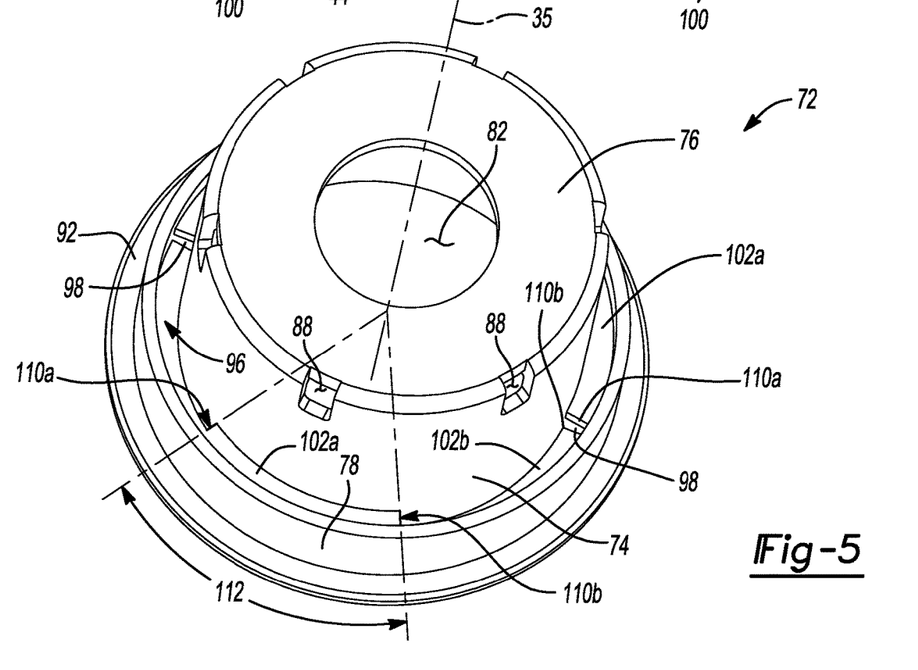
FIG. 5 is a top perspective view depicting the damper bumper cap shown in FIG. 3.
Figure 6:
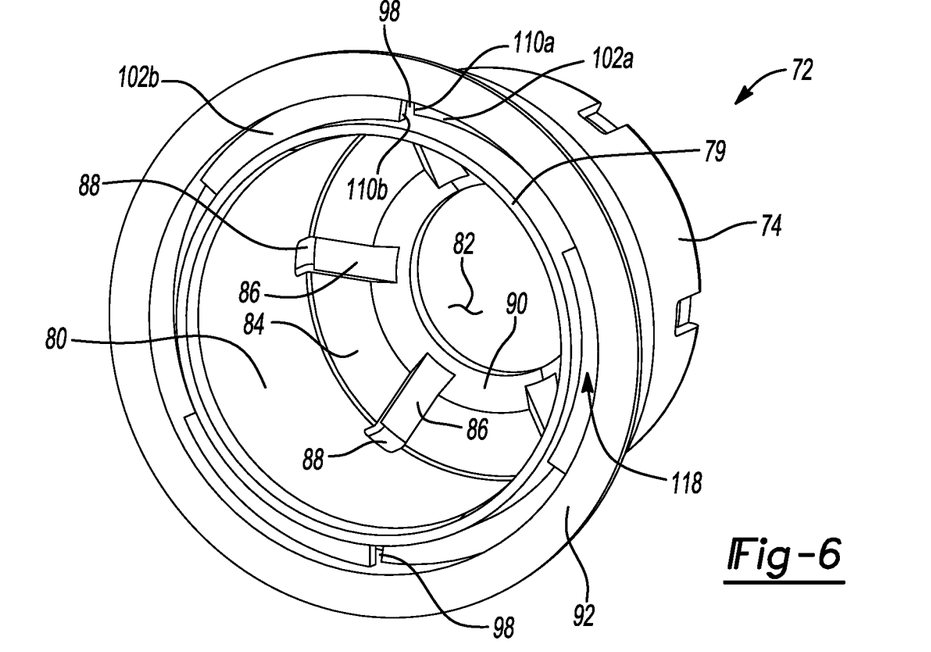
FIG. 6 is a bottom perspective view depicting the damper bumper cap shown in FIG. 3.

The vent openings 98 in the connection wall 96 are defined between the connection wall segments 102a, 102b. In the illustrated embodiment, the connection wall segments 102a, 102b in the first group of connection wall segments 102a and the second group of connection wall segments 102b are staggered circumferentially such that the connection wall ends 110a, 110b of the connection wall segments 102a in the first group of connection wall segments 102a are substantially radially aligned with the connection wall ends 110a, 110b of the connection wall segments 102b in the second group of connection wall segments 102b. As best seen in FIGS. 5 and 6, the vent openings 98 extend longitudinally between the connection wall end 110a of a connection wall segment 102a in the first group of connection wall segments 102a and an adjacent connection wall end 110b of a connection wall segment 102b in the second group of connection wall segments 102b.

In the illustrated examples, the connection wall segments 102a, 102b in the first group of connection wall segments 102a and the second group of connection wall segments 102b extend from the side wall 74 at an oblique angle 114. The connection wall segments 102a in the first group of connection wall segments 102a slope towards the end wall 76 moving radially from the annular skirt 78 to the side wall 74. The connection wall segments 102b in the second group of connection wall segments 102b slope towards the side wall end 79 moving radially from the annular skirt 78 to the side wall 74. The sloped arrangement of the connection walls 96 allows water, dust, and other contaminants to drain from the cap 72. However, other configurations are possible. For example, the connection wall segments 102a, 102b in the first group of connection wall segments 102a and the second group of connection wall segments 102b may be perpendicular to the annular skirt 78 and the side wall 74. In other words, the connection wall segments 102a, 102b may extend from the side wall 74 at a 90 degree angle.

The second skirt end 91b is positioned radially outward of the side wall end 79 and the annular skirt 78 has a smaller height (i.e., longitudinal length L1) than the height (i.e., longitudinal length L2) of the side wall 74. Accordingly, a first valley region 116 is defined by the first skirt end 91a, the connection wall 96, and the side wall 74. A second valley region 118 is defined by the second skirt end 91b, the connection wall 96, and the side wall end 79. When the shock absorber 26 is in the orientation shown in the FIG. 2, the first valley region 116 is positioned above the connection wall 96 and the second valley region 118 is positioned below the connection wall 96. The first and second valley regions 116, 118 extend annually between the annular skirt 78 and the side wall 74 and generally have U-shaped cross-sections. The sides of the U-shaped cross-sections are formed by the annular skirt 78 and the side wall 74 respectively and the base of the U-shaped cross-sections are formed by the connection wall 96. The first and second valley regions 116, 118 are disposed in fluid communication with one another via the vent openings 98 in the connection wall 96. Therefore, the plurality of tortuous airflow paths 100 extend between the first and second valley regions 116, 118.

During a compression stroke of the shock absorber 26, the dust cover 62 is longitudinally compressed. As a result, air is forced out of the inner chamber 66 inside the dust cover 62. During a rebound stroke of the shock absorber 26, the dust cover 62 expands longitudinally and air flows into the inner chamber 66 inside the dust cover 62. The inner chamber 66 inside the dust cover 62 therefore must be vented to the atmosphere. If this were not so, the pressure in the inner chamber 66 inside the dust cover 62 would blow the dust cover 62 off the shock absorber 26 during a compression stroke. One problem with venting the inner chamber 66 inside the dust cover 62 is that water, dust, and other contaminants can enter the inner chamber 66 inside the dust cover 62 and foul the piston rod seal 60. In accordance with the designs provided herein, there is no direct, longitudinally extending airflow path through the cap 72. Instead, during a rebound stroke, air from the atmosphere must flow longitudinally through the second valley region 118, change direction and flow circumferentially through the vent openings 98 between the connection wall segments 102a, 102b in the first group of connection wall segments 102a and the second group of connection wall segments 102b, and then change direction again and flow longitudinally through the first valley region 116. Testing has confirmed that water, dust, and other contaminants get trapped in the second valley region 118 such that a reduced amount of contaminants enter the inner chamber 66 inside the dust cover 62.

Figure 4:
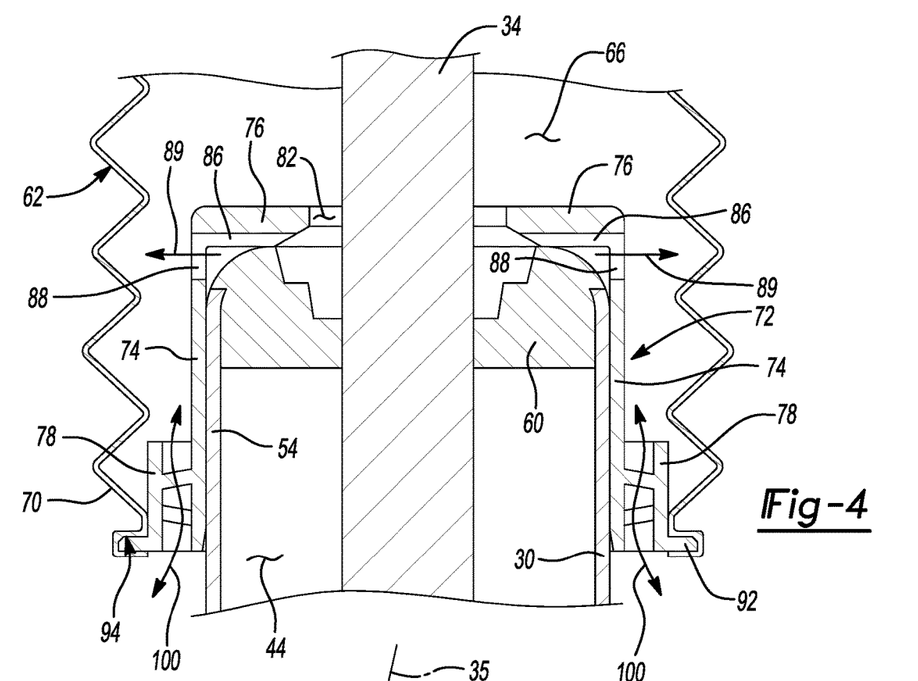
FIG. 4 is a side cross-sectional view depicting the damper bumper cap shown in FIG. 3 after installation in a shock absorber.
Figure 7:
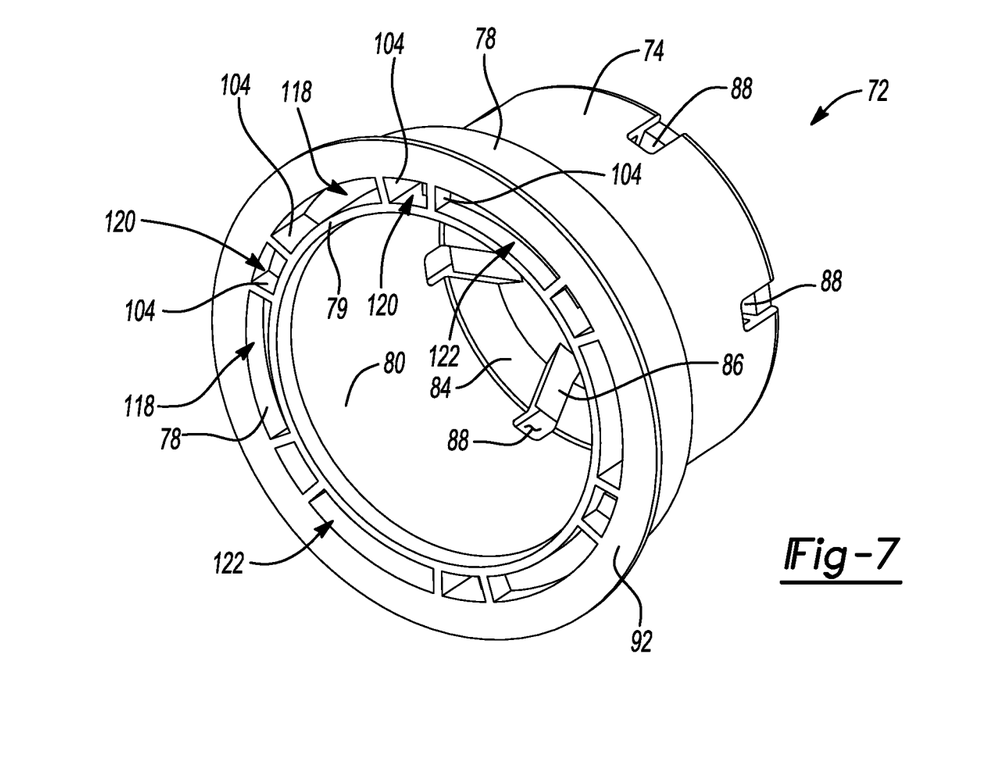
FIG. 7 is a bottom perspective view of another exemplary damper bumper cap constructed in accordance with the teachings of the present disclosure where restriction walls have been added.
Figure 8:
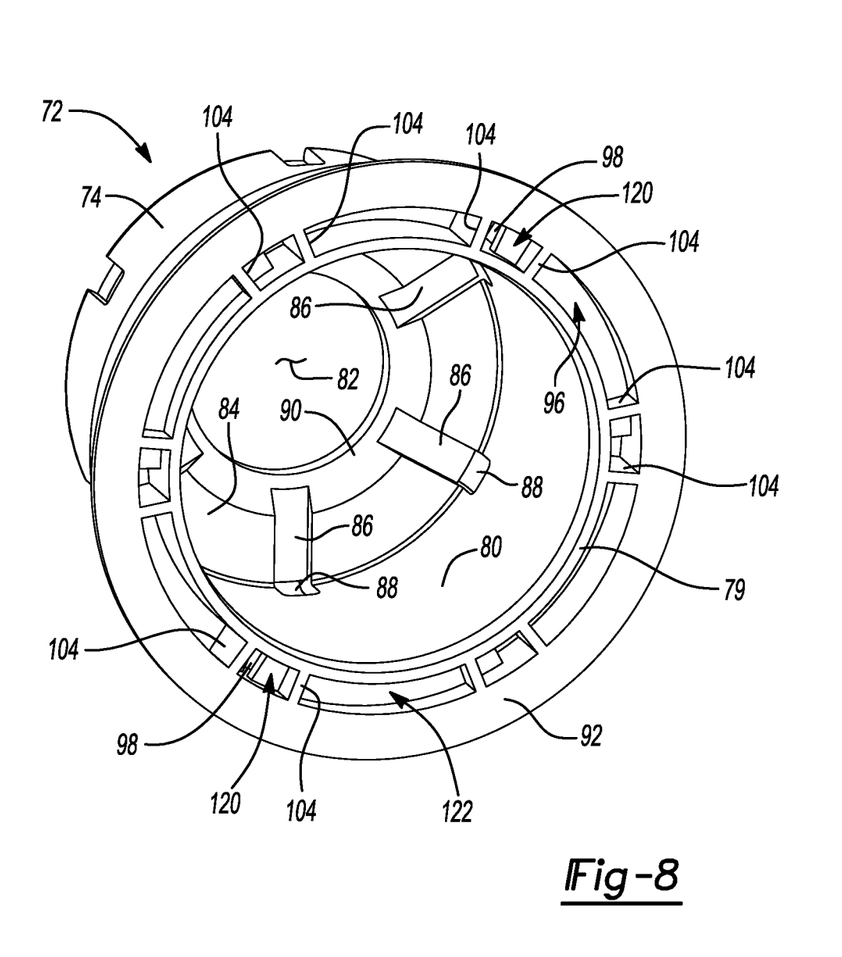
FIG. 8 is another bottom perspective view depicting the damper bumper cap shown in FIG. 7.
Figure 9:
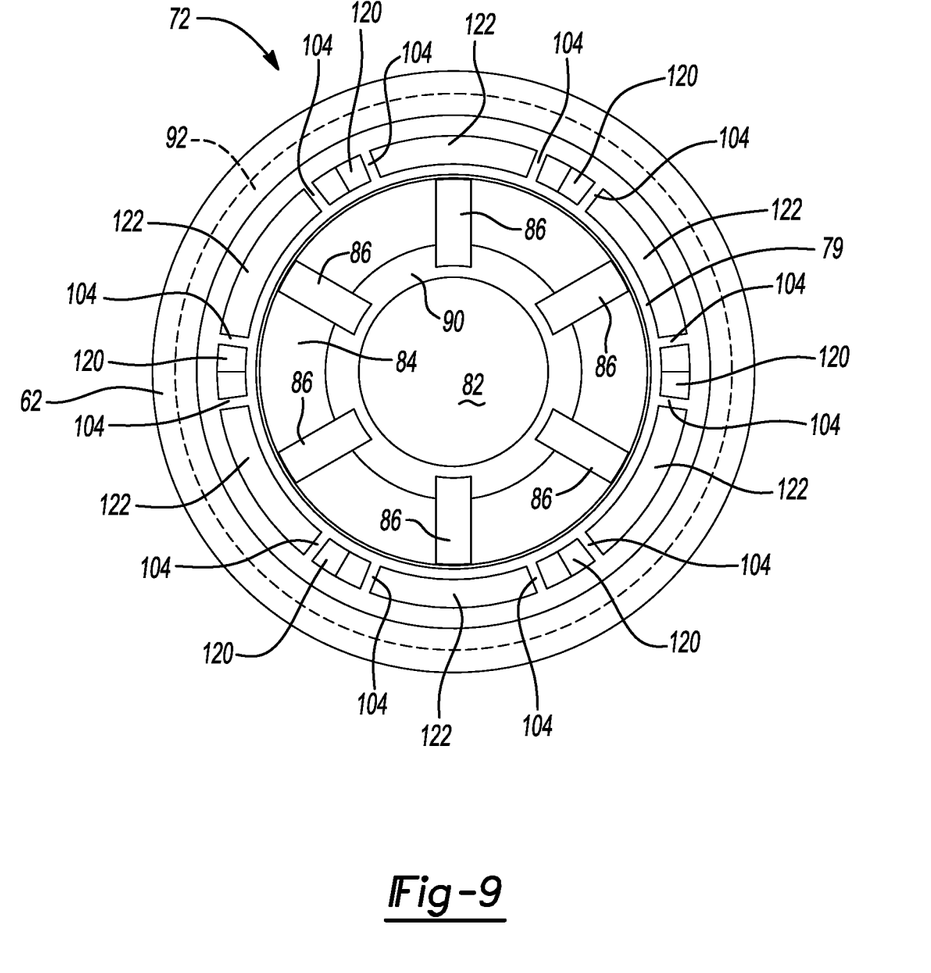
FIG. 9 is a bottom plan view depicting the damper bumper cap shown in FIG. 7 after a dust cover is installed.

With reference to FIGS. 7-9, longitudinal restriction walls 104 may optionally be provided in the cap 72. The longitudinal restriction walls 104 extend longitudinally from the connection wall 96 into the second valley region 118 and radially from the side wall 74 to the annular skirt 78. The longitudinal restriction wall 104 divides the second valley region 118 into open chambers 120 that communicate with the vent openings 98 in the connection wall 96 and closed chambers 122 that do not communicate with the vent openings 98. By dividing the second valley region 118 up into multiple chambers 120, 122, the second valley region 118 traps even more water, dust, and other contaminants. As shown in FIGS. 4 and 9, other than the plurality of tortuous airflow paths 100, there are no additional airflow paths through which air from the atmosphere (i.e., the surrounding environment) can enter the inner chamber 66 inside the dust cover. As a result, fewer contaminants reach the piston rod seal 60, prolonging the service life of the shock absorber 26 and reducing complaints due to hydraulic fluid leaks from the piston rod seal 60. The subject designs therefore reduce the number of warranty claims due to failed/damaged piston rod seals 60.

Figure 10:
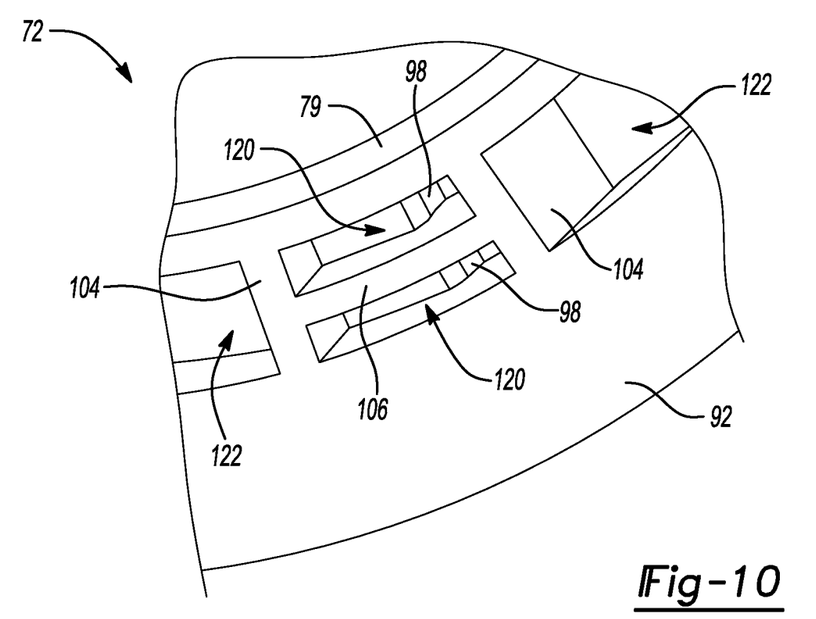
FIG. 10 is an enlarged, partial bottom perspective view of another exemplary damper bumper cap constructed in accordance with the teachings of the present disclosure where additional restriction walls have been added.
Figure 11:
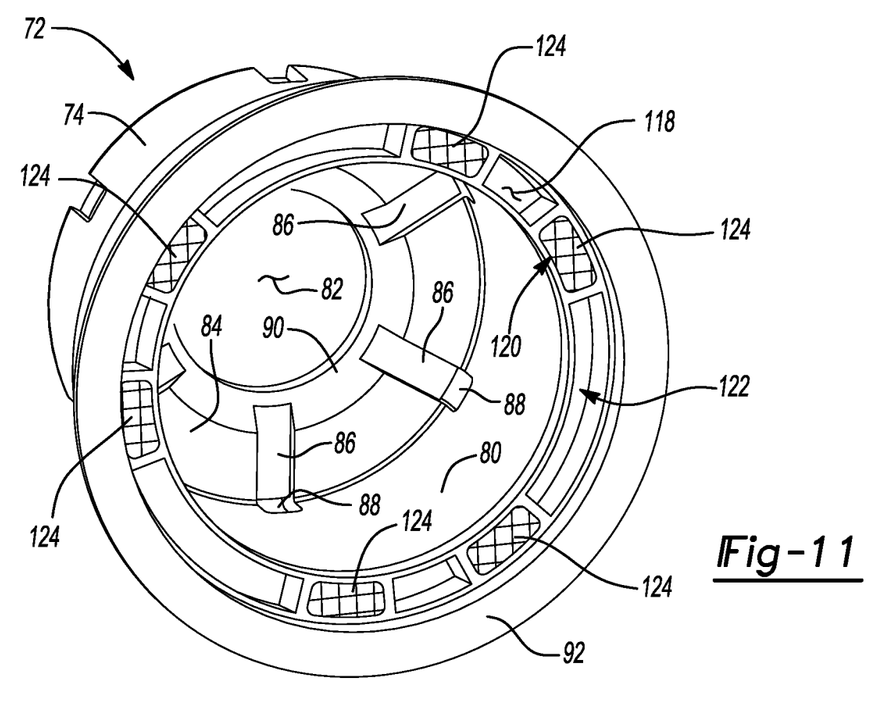
FIG. 11 is a bottom perspective view of another exemplary damper bumper cap constructed in accordance with the teachings of the present disclosure where filter elements have been added.

With additional reference to FIG. 10, circumferential restriction walls 106 may also be provided in the cap 72. Each circumferential restriction wall 106 is positioned in the open chambers 120 and extends circumferentially between adjacent longitudinal restriction walls 104. The addition of the circumferential restriction walls 106 further increases the serpentine shape of the tortuous airflow paths 100 through the cap 72, resulting in fewer contaminants reaching the piston rod seal 60. With additional reference to FIG. 11, filter elements 124 may optionally be positioned in the second valley region 118 adjacent to the vent openings 98. In the illustrated embodiment, the filter elements 124 are positioned in the open chambers 120 of the second valley region 118. The filter elements 124 maybe made of a variety of different materials, including without limitation, paper or cotton.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the subject disclosure, and all such modifications are intended to be included within the scope of the subject disclosure.

What is claimed is:

1. A damper system for a vehicle, comprising:
   a damper tube extending longitudinally between a rod side end and a closed end;
   a piston rod extending into the rod side end of the damper tube along a longitudinal axis;
   a piston assembly coupled to the piston rod and slidably fitted in the damper tube;
   a piston rod seal positioned radially between the piston rod and the rod side end of the damper tube;
   a dust cover extending annularly about the rod side end of the damper tube and an exposed portion of the piston rod that is positioned outside the damper tube; and
   a cap positioned over the rod side end of the damper tube and the piston rod seal, the cap including a side wall positioned in contact with and extending annularly about the rod side end of the damper tube, an end wall extending radially inwardly from the side wall and over at least a portion of the piston rod seal, an annular skirt spaced radially outward of the side wall relative to the longitudinal axis, and a connection wall extending between the side wall and the annular skirt, the cap and the dust cover cooperating to define an inner chamber around a portion of the piston rod, the cap and dust cover being in sealing engagement with one another, wherein the end wall of the cap includes a rod aperture through which the piston rod extends and wherein the connection wall of the cap includes vent openings between the annular skirt and the side wall that define a plurality of tortuous airflow paths through the cap that vent the inner chamber to a space outside the dust cover;
   wherein the cap includes a flange that extends radially outwardly from the annular skirt relative to the longitudinal axis and wherein the dust cover includes an annular groove that receives the flange of the cap such that air flow cannot travel between the dust cover and the annular skirt of the cap.

2. The damper system of claim 1, wherein the side wall of the cap extends longitudinally from the end wall to a side wall end, the connection wall includes a first group of connection wall segments and a second group of connection wall segments that are arranged at different heights relative to the side wall end, and the vent openings are defined between the connection wall segments in the first group of connection wall segments and the connection wall segments in the second group of connection wall segments.

3. The damper system of claim 2, wherein each of the connection wall segments in the first group of connection wall segments and the second group of connection wall segments has a limited circumferential extent of 90 degrees or less relative to the longitudinal axis.

4. The damper system of claim 2, wherein the connection wall segments in the first group of connection wall segments and the second group of connection wall segments are perpendicular to the annular skirt and the side wall.

5. The damper system of claim 2, wherein the connection wall segments in the first group of connection wall segments slope towards the end wall moving radially from the annular skirt to the side wall and the connection wall segments in the second group of connection wall segments slope towards the side wall end moving radially from the annular skirt to the side wall.

6. The damper system of claim 1, wherein the side wall of the cap extends longitudinally from the end wall to a side wall end, the connection wall includes first and second connection wall segments that are arranged at different heights relative to the side wall end, and the vent openings are defined between the first and second connection wall segments.

7. The damper system of claim 6, wherein each connection wall segment of the first and second connection wall segments has a limited circumferential extent of 180 degrees or less.

8. The damper system of claim 1, wherein the piston rod extends longitudinally between a first end and a second end, the first end of the piston rod supporting a jounce bumper, the second end of the piston rod coupled to the piston assembly, and the cap protecting the piston rod seal from contact with the jounce bumper when the damper system is in a compressed state.

9. A damper system for a vehicle, comprising:
   a damper tube extending longitudinally between a rod side end and a closed end;
   a piston rod extending into the rod side end of the damper tube along a longitudinal axis;
   a piston assembly coupled to the piston rod and slidably fitted in the damper tube;
   a piston rod seal positioned radially between the piston rod and the rod side end of the damper tube;
   a dust cover extending annularly about the rod side end of the damper tube and an exposed portion of the piston rod that is positioned outside the damper tube; and
   a cap positioned over the rod side end of the damper tube and the piston rod seal, the cap including a side wall positioned in contact with and extending annularly about the rod side end of the damper tube, an end wall extending radially inwardly from the side wall and over at least a portion of the piston rod seal, an annular skirt spaced radially outward of the side wall relative to the longitudinal axis, and a connection wall extending between the side wall and the annular skirt, the cap and the dust cover cooperating to define an inner chamber around a portion of the piston rod, wherein the end wall of the cap includes a rod aperture through which the piston rod extends and wherein the connection wall of the cap includes vent openings between the annular skirt and the side wall that define a plurality of tortuous airflow paths through the cap that vent the inner chamber to a space outside the dust cover, wherein the annular skirt extends longitudinally between first and second skirt ends, a first valley region is defined by the first skirt end and the connection wall and the side wall, a second valley region is defined by the second skirt end and the connection wall and the side wall end, and the plurality of tortuous airflow paths extend between the first and second valley regions.

10. A damper system for a vehicle, comprising:
a damper tube extending longitudinally between a rod side end and a closed end;
a piston rod extending into the rod side end of the damper tube along a longitudinal axis;
a piston assembly coupled to the piston rod and slidably fitted in the damper tube;
a piston rod seal positioned radially between the piston rod and the rod side end of the damper tube;
a dust cover extending annularly about the rod side end of the damper tube and an exposed portion of the piston rod that is positioned outside the damper tube; and
a cap positioned over the rod side end of the damper tube and the piston rod seal, the cap including a side wall positioned in contact with and extending annularly about the rod side end of the damper tube, an end wall extending radially inwardly from the side wall and over at least a portion of the piston rod seal, an annular skirt spaced radially outward of the side wall relative to the longitudinal axis, and a connection wall extending between the side wall and the annular skirt, the cap and the dust cover cooperating to define an inner chamber around a portion of the piston rod, wherein the end wall of the cap includes a rod aperture through which the piston rod extends and wherein the connection wall of the cap includes vent openings between the annular skirt and the side wall that define a plurality of tortuous airflow paths through the cap that vent the inner chamber to a space outside the dust cover, wherein the side wall of the cap includes an inside surface that is cylindrical in shape, smooth, and arranged in an interference fit with the damper tube such that air flow cannot travel between the damper tube and the inside surface of the side wall.

11. A damper system for a vehicle, comprising:
a damper tube extending longitudinally between a rod side end and a closed end;
a piston rod extending into the rod side end of the damper tube along a longitudinal axis;
a piston assembly coupled to the piston rod and slidably fitted in the damper tube;
a piston rod seal positioned radially between the piston rod and the rod side end of the damper tube;
a dust cover extending annularly about the rod side end of the damper tube and an exposed portion of the piston rod that is positioned outside the damper tube; and
a cap positioned over the rod side end of the damper tube and the piston rod seal, the cap including a side wall positioned in contact with and extending annularly about the rod side end of the damper tube, an end wall extending radially inwardly from the side wall and over at least a portion of the piston rod seal, an annular skirt spaced radially outward of the side wall relative to the longitudinal axis, and a connection wall extending between the side wall and the annular skirt, the cap and the dust cover cooperating to define an inner chamber around a portion of the piston rod, wherein the end wall of the cap includes a rod aperture through which the piston rod extends and wherein the connection wall of the cap includes vent openings between the annular skirt and the side wall that define a plurality of tortuous airflow paths through the cap that vent the inner chamber to a space outside the dust cover, wherein the end wall includes an inner surface with radially extending channels and the side wall includes side wall openings that are disposed in fluid communication with the radially extending channels on the inner surface of the end wall.

12. A damper system for a vehicle, comprising:
a damper tube extending longitudinally between a rod side end and a closed end;
a piston rod extending along a longitudinal axis between first and second piston rod ends, the second piston rod end disposed inside the damper tube;
a jounce bumper supported on the first piston rod end;
a piston assembly coupled to the second piston rod end and slidably fitted in the damper tube;
a piston rod seal positioned radially between the piston rod and the rod side end of the damper tube;
a dust cover extending annularly about the rod side end of the damper tube and an exposed portion of the piston rod that is positioned outside the damper tube; and
a cap positioned over the rod side end of the damper tube and the piston rod seal, the cap and the dust cover cooperating to define an inner chamber, the cap including a side wall positioned in contact with and extending annularly about the rod side end of the damper tube, an end wall extending radially inwardly from the side wall and over at least a portion of the piston rod seal, an annular skirt spaced radially outward of the side wall relative to the longitudinal axis, a first group of connection wall segments extending radially between the side wall and the annular skirt, a second group of connection wall segments extending radially between the side wall and the annular skirt, and a plurality of vent openings axially extending through an end face of the cap opposite the end wall and being defined between the connection wall segments in the first group of connection wall segments and the connection wall segments in the second group of connection wall segments that create a plurality of tortuous airflow paths through the cap at circumferentially spaced locations that vent the inner chamber to a space outside the dust cover.

13. The damper system of claim 12, wherein the side wall of the cap extends longitudinally from the end wall to a side wall end and wherein the connection wall segments in the first group of connection wall segments are arranged at a different height than the connection wall segments in the second group of connection wall segments relative to the side wall end.

14. The damper system of claim 12, wherein the connection wall segments in the first group of connection wall segments and the second group of connection wall segments extend from the side wall at a 90 degree angle.

15. The damper system of claim 12, wherein the connection wall segments in the first group of connection wall segments and the second group of connection wall segments extend from the side wall at an oblique angle.

\* \* \* \* \*